Dec. 12, 1961 R. M. SMYTH-DAVILA 3,012,614
HELICOPTER
Original Filed April 12, 1951 2 Sheets-Sheet 1

Rodrigo M. Smyth-Davila
INVENTOR.

BY *[signatures]*
Attorneys

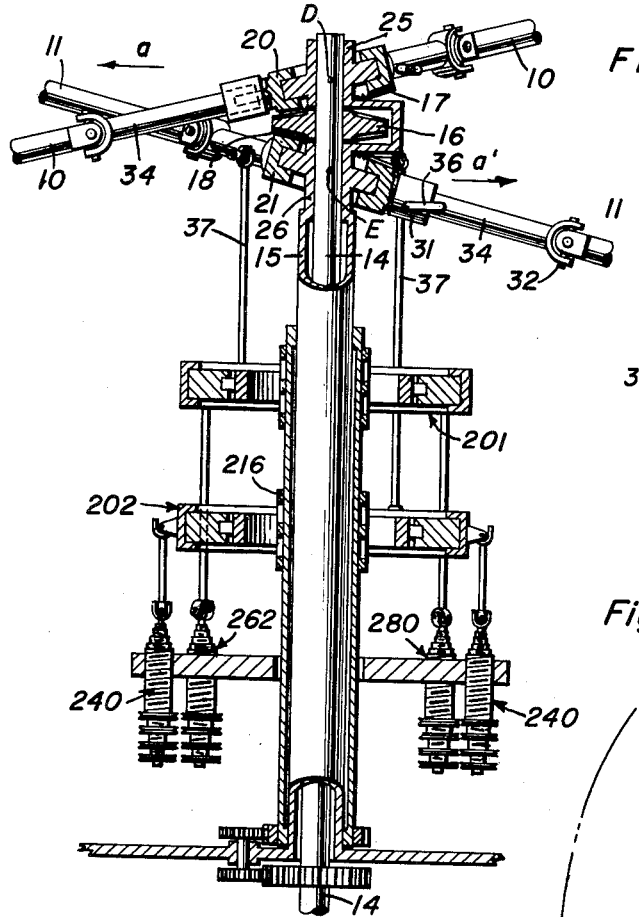
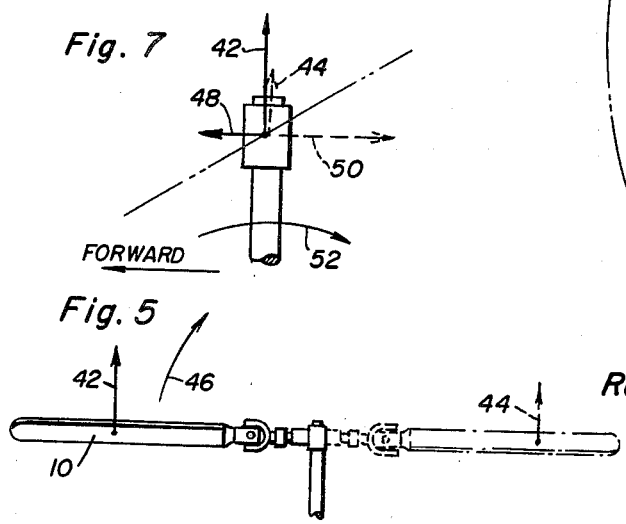
Rodrigo M. Smyth-Davila
INVENTOR.

United States Patent Office 3,012,614
Patented Dec. 12, 1961

3,012,614
HELICOPTER
Rodrigo M. Smyth-Davila, Apartado 769,
San Jose, Costa Rica
Original application Apr. 12, 1951, Ser. No. 220,557. Divided and this application Feb. 28, 1957, Ser. No. 643,075
7 Claims. (Cl. 170—135.22)

This is a divisional application, describing and claiming an embodiment of the invention originally forming part of my earlier copending application, Serial No. 220,557, filed April 21, 1951, now abandoned.

The invention relates to aircraft with rotating wings, such as helicopters and it has for its main object to provide a drive and control system for aircraft of the above named type in which a force counteracting the reaction force produced by the rotating wing structure, is produced under the control of the pitch control system of the blades of the wing structure.

In the above identified application, Serial No. 220,557, a system is described in which the counter force counteracting the reaction force is produced by so adjusting the pitch or bite of the blades during rotation of each blade in the same direction, that each blade rotates essentially around an axis which is inclined with respect to the drive shaft axis supplying power and that in addition the inclination of the axis around which each blade rotates varies during a revolution, this being produced by the co-operation of the driving means with a pitch control system equipped with means for cyclically varying the pitch of the blades.

The present invention has for a further object a rotary wing structure in which the blades again rotate in the same direction in planes and around axes which are inclined toward the axis of the drive shaft, this inclination being obtained by structural means which guide the blades. This inclination of the axis around which the blades rotate relatively to the drive shaft axis in constant, but different sets of blades have a different inclination. Each of the two sets of blades produces a reaction couple and these reaction couples produce a tilting movement of the structure which is however counteracted by the fuselage. The structural guiding means for the blade rotors are such that it is possible to produce a rotary wing structure which will not necessitate special means for counteracting the reaction couple.

The invention is illustrated in the accompanying drawing by way of example. It will be clear that means other than those illustrated will be available to the expert to obtain the same result and a departure from the example illustrated is not necessarily a departure from the principle of the invention.

Figure 1:
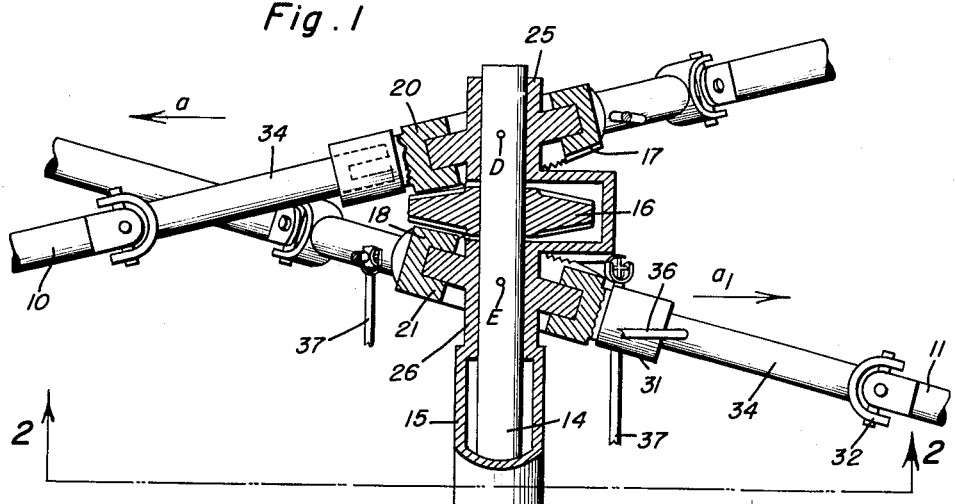
Figure 2:
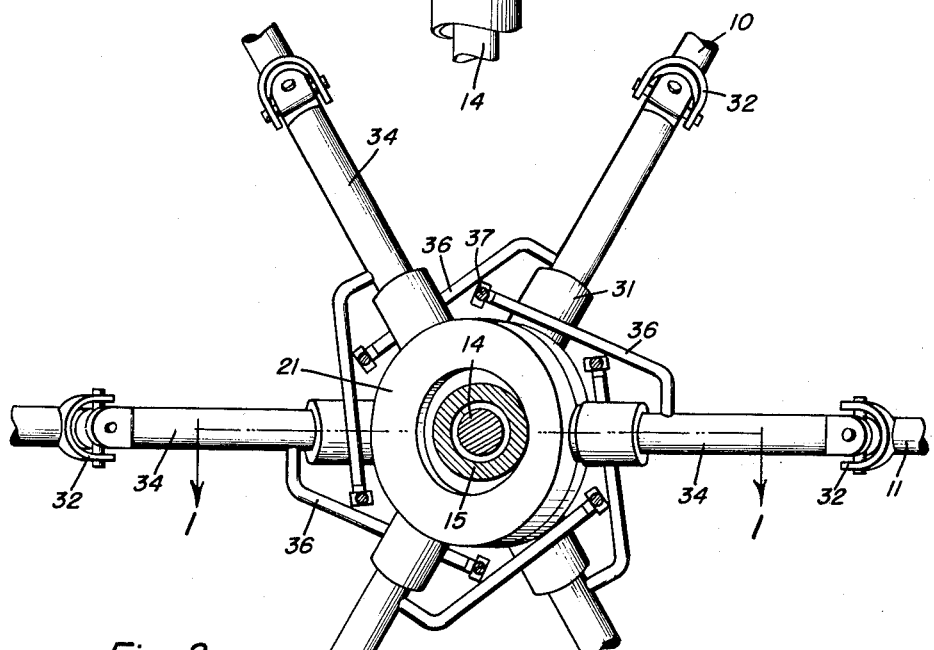

In the drawing:
FIGURE 1 is a sectional elevational view of the central portion of a rotary wing structure of a helicopter, the section being taken along line 1—1 of FIGURE 2;
FIGURE 2 is a partly sectional plan view of the central portion of the rotating wing structure shown in FIGURE 1, the section being taken along line 2—2 of FIGURE 1;
FIGURE 3 is a vertical sectional view of the helicopter rotor assembly and adjustable swash plate assemblies;
FIGURE 4 is an operational diagram showing the effect of lift on a rotor wing cross-section as its pitch is changed from a solid line position to a dotted line position;
FIGURES 5, 6 and 7 are schematic operational diagrams, showing one rotor wing in solid and dotted line positions, as viewed from the front, top and side thereof, respectively.

The invention illustrated in FIGURES 1 and 2 comprises two sets of blades 10, 11 mounted on the same tubular mast structure 15, rotating in planes which are inclined in opposite directions towards the axis of rotation. The tubular mast structure 15 surrounds the drive shaft 14 which transmits its power to the blades 10, 11 by means of a special rear wheel 16 fixed on the shaft 14 which is provided with two sets of slightly conical bevel gear teeth meshing with corresponding gear wheels 17, 18 which are part of or fixed to the hub members 20, 21 of the two rotors. The hub members are carried by supporting cam disks 25, 26 respectively which run in internal annular runways of the hub members. The cam disks 25, 26 form part of or are fixed to the mast structure 15. It will therefore be clear that each hub member 20, 21 will rotate in a plane, when driven by the gear wheel 16, which is inclined with respect to the axis of the shaft 14 and which is also inclined with respect to the plane in which the other hub member rotates.

In the example shown the hub member 20 is provided with three blades 10 and the hub member 21 is provided with three blades 11 which are joined to the respective hub member by the customary thrust and radial bearings 31 permitting rotation of the blade around the axis of said bearing. On the ends of said arms universal joint 32 are arranged by means of which the blades are connected with the arms 34. The universal joints permit an all round movement of the blade with respect to the arm. The three blades of each set are so arranged with respect to each other that they alternate so that they will not interfere with each other. The two rotors rotate in the same direction as will be clear from the figures.

The rotors illustrated in FIGURES 1 and 2 are also provided with a means for producing cyclic lift variations which are identical with those described in the modifications of the invention described in my earlier application, Serial No. 220,557, from which this application is a division, as shown in FIGURE 3; they are therefore not shown in their entirety in this figure. These means comprise pitch adjusting arms 36 attached to the arms 34 and pitch control rods 37 attached to said arms by means of universal joints and connected with pitch control means such as swash plate assemblies 201 and 202, controlled by any suitable tilting mechanism such as 240, 262 and 280 more specifically dealt with in another continuing application No. 643,910 filed February 28, 1957.

It will be clear that in the example illustrated in FIGURES 1 and 2 the angular velocity of the hubs 20, 21 is constant. According to the principles which have been explained above, the chordwise bending stresses which result from the secondary flapping movement are reduced as much as possible if the flapping hinges 32 are located as far as possible and as far as practical from the vertical axis of rotation. The arms 34 must therefore be as long as possible.

Each of the two sets of blades will produce a reaction having a horizontal component and therefore a tilting of the structure in the direction of the arrows $a$, $a_1$ will result. However, as the two sets produce reactions in opposite directions (indicated by the two arrows $a$, $a_1$) the two reactions will copensate each other. However, they do not neutralize each other as their points of attack are not identical. Therefore they produce a couple having the tendency to tilt the mast structure which is attached to the fuselage. The torque produced by the couple may be kept within limits by reducing the distance between points D and E to a minimum, the two points being those points of the structure where the reactions are supposed to attack.

The torque produced by the reaction couple is of course counteracted by the weight of the fuselage which is tilted. Under normal circumstances no special precaution need be taken as the weight of the fuselage is such that it will not materially be tilted and the angle with respect to the vertical at which the helicopter flies and which is due to the reaction couple is very small.

With reference to FIGURES 3 and 4, it will now become apparent to anyone skilled in the art, that by adjusting the tilt of the swash plate assemblies 201 and 202, rotation of the rotors in its inclined plane will cause the pitch of the rotor blades to cyclically vary between extreme pitch positions as illustrated for example in FIGURE 5 showing such pitch variation for a single rotor blade cross-section. Accordingly, the aerodynamic lift force imposed on the rotor wing as represented by arrows 38 and 40 of equal magnitude, will resolve into vertical and horizontal lift components as clearly seen in FIGURE 5. It is therefore clear, that in one position shown dotted the rotor wing will have a greater lift component and a smaller horizontal component.

Referring now to FIGURE 5, a single rotor wing 10 is shown in two diametrically opposite positions as viewed from the front of the helicopter. In the solid line position of the rotor 10 for example, the vertical lift component represented by arrow 42 is greater than the vertical lift component 44 on the rotor 10 when in its dotted line position. As viewed in FIGURE 5 therefore, the rotor assembly tends to rotate in a clockwise direction as indicated by arrow 46.

Referring now to FIGURE 6, the view of the rotor assembly from the top shows the horizontal lift components 48 and 50 on the same rotor in its two same positions, wherein the horizontal component 50 is greater than the horizontal component 48 tending therefore to rotate the rotor assembly in a clockwise direction as seen in FIGURE 7 and as indicated by arrow 52 therein. It is therefore obvious, that the rotation of a single rotor 10 with its pitch being cyclically varied as hereinabove described, will tend to cause the rotor assembly and the helicopter on which it is mounted, to turn clockwise and upwardly as viewed in FIGURES 5 and 7, respectively. Also, it will be noted that the vertical lift imposed on the rotor assembly will pulsate between a maximum value as indicated by arrow 42 and a minimum value as indicated by arrow 44 as shown in FIGURE 7. The latter pulsations of the vertical component of aerodynamic lift, will therefore counteract the vertical reaction forces imposed on the rotor assembly support frame resulting from the restraint imposed by the frame on the rotating blades, constraining them to rotate in an inclined plane. Accordingly, the pulsating vertical reaction forces imposed on the helicopter frame by the rotating blades, are counteracted, and reduced by if not eliminated by the pulsating aerodynamic vertical lift, which is of obvious and advantageous import.

With regard to the tendency of the rotating rotor to cause tilting of the helicopter as hereinabove explained, atention is now directed to the fact that the other rotor assembly 11 is also undergoing cyclically varying pitch changes as it rotates in the same direction by an oppositely directed inclined plane and through cooperation with a different swash plate assembly may impose opposite tilting tendencies on the helicopter frame. Since the cyclically varying pitch characteristics of both rotors 10 and 11 are separately controlled, cancellation of the tilting tendencies so effected or the preponderance of the tilting tendency of the rotor about the center of gravity of the air frame effected by one rotor over that of the other may be varied to effect controlled tilting of the helicopter.

It is therefore apparent, that by controlling the amount and direction of tilt of the swash plate assemblies 201 and 202 relative to each other, the aerodynamic pulsations on the rotor assembly may be varied to counteract the vertical reaction force pulsations on the rotor assembly and also to establish some control over the tilting tendencies imposed on the helicopter itself, resulting from rotation of the rotors which may be of use in conjunction with the turning of the helicopter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

Having described the invention what is claimed is:

1. A drive and control system for a helicopter comprising, a mast fixed to the helicopter, a plurality of hub members mounted one above the other on said mast and rotated by drive means rotating in the same direction about a common vertical axis through said mast, each hub member having a set of blades attached thereto, a plurality of fixed guiding members fixed to said mast and inclined in different directions, cooperating guided means on said hub members, guided by said guiding members, each hub member thus being forced to rotate about an inclined axis by one of the fixed inclined guiding members effective thereby to rotate said hub members and their respective sets of blades in planes correspondingly inclined in different directions, means to drive the blades in their inclined planes of rotation, and adjustable pitch controlling means for cyclically varying the pitch of the blades, resulting in the production of a turning moment acting on the helicopter and having a component which opposes and thereby counteracts the reaction produced in driving the blades.

2. The combination of claim 1, wherein said adjustable pitch controlling means for cyclically varying the pitch of the blades comprises a plurality of tiltable swash plates, each swash plate being capable of varying the pitch of one set of blades.

3. The combination of claim 1, wherein said adjustable pitch controlling means for cyclically varying the pitch of the blades to produce corresponding cyclic lift variations include a plurality of swash plate means selectively adjustable in the same or opposite directions.

4. A drive and control system for helicopters as claimed in claim 1 wherein the driving means include a drive shaft and wherein the guiding means consist of inclined disk like collars projecting from a sleeve coaxial with the drive shaft and connected with the mast, while the hub members surround the disk like collars and are provided with grooves on their inside engaging the disk like collars.

5. A drive and control system as claimed in claim 4, wherein in addition each hub member is provided with bevel gear teeth and wherein the drive shaft is connected with a bevel gear wheel engaging the bevel gear teeth of said hub member.

6. A drive and control system as claimed in claim 4, wherein the drive shaft is provided with a double bevel gear arranged between two disk like collars and wherein two hub members, each having a set of blades attached to it, are provided with bevel gears on opposite sides engaging the double bevel gear.

7. A drive and control system for helicopters comprising a drive shaft, a stationary mast concentric with the drive shaft, a rotary wing structure including sets of blades, each set being connected with and carried by a hub member, each hub member being provided with a guide means, and being further provided with a bevel gear, a guiding means for each hub member fixedly mounted on the stationary mast, each of the guiding means having guiding surfaces inclined with respect to the axis of the drive shaft and inclined with respect to each other engaging the guide means of a hub member, each set of blades thus rotating about an axis which is inclined with respect to the drive shaft axis, the axes about which different sets of blades rotate being so inclined with respect to each other, a bevel gear wheel on the drive shaft and provided with a plurality of bevel gears each meshing with the bevel gear of one of the hub members and transmitting power from the drive shaft to said hub members to rotate all of said hub members and blades in the same direction, and means for cyclically varying the pitch of the blades to produce corresponding cyclic lift variations.

References Cited in the file of this patent

UNITED STATES PATENTS

| | | |
|---|---|---|
| 2,427,981 | Thompson | Sept. 23, 1947 |
| 2,521,012 | Kay et al. | Sept. 5, 1950 |

OTHER REFERENCES

Ser. No. 254,867, Flettner (A.P.C.), published May 25, 1943.